US010824362B2

(12) United States Patent
Voigt et al.

(10) Patent No.: US 10,824,362 B2
(45) Date of Patent: Nov. 3, 2020

(54) FILE MIGRATION TO PERSISTENT MEMORY (71) Applicant: HEWLETT PACKARD ENTERPRISE DEVELOPMENT LP, Houston, TX (US)

(72) Inventors: Douglas L. Voigt, Boise, ID (US); Meng Zou, Fremont, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 229 days.

(21) Appl. No.: 15/507,185

(22) PCT Filed: Mar. 27, 2015

(86) PCT No.: PCT/US2015/022946
§ 371 (c)(1),
(2) Date: Feb. 27, 2017

(87) PCT Pub. No.: WO2016/159930
PCT Pub. Date: Oct. 6, 2016

(65) Prior Publication Data
US 2017/0329554 A1    Nov. 16, 2017

(51) Int. Cl.
*G06F 3/06* (2006.01)
*G06F 12/00* (2006.01)
(Continued)

(52) U.S. Cl.
CPC .......... *G06F 3/0647* (2013.01); *G06F 3/0611* (2013.01); *G06F 3/0643* (2013.01);
(Continued)

(58) Field of Classification Search
CPC . G06F 3/06; G06F 12/00; G06F 13/00; G06F 17/30
(Continued)

(56) References Cited

U.S. PATENT DOCUMENTS 6,202,124 B1    3/2001   Kern et al.
6,321,233 B1    11/2001  Larson
(Continued)

FOREIGN PATENT DOCUMENTS

CN    101490651 A    7/2009
CN    102483714 A    5/2012
(Continued)

OTHER PUBLICATIONS

Coburn, J. et al., "NV-heaps: Making Persistent Objects Fast and Safe with Next-generation, Non-volatile Memories," (Research Paper), Mar. 5-11, 2011, 13 pages, available at http://cseweb.ucsd.edu/~swanson/papers/Asplos2011NVHeaps.pdf.
(Continued)

*Primary Examiner* — Tuan V Thai
(74) *Attorney, Agent, or Firm* — Trop, Pruner & Hu, P.C.

(57) ABSTRACT

Various examples described herein provide for migrating a file between a non-persistent memory file system and a persistent memory file system. In particular, some examples detect, on a non-persistent memory file system, a file that has been memory-mapped while being accessed from the non-persistent memory file system by a computer system, and the detected file is migrated from the non-persistent memory file system to the persistent memory file system.

17 Claims, 8 Drawing Sheets

(51) Int. Cl.
*G06F 16/17* (2019.01)
*G06F 11/00* (2006.01)
*G06F 16/11* (2019.01)
*G06F 11/14* (2006.01)

(52) U.S. Cl.
CPC ............ *G06F 3/0685* (2013.01); *G06F 11/00* (2013.01); *G06F 11/14* (2013.01); *G06F 16/119* (2019.01); *G06F 16/1727* (2019.01)

(58) Field of Classification Search
USPC .............................. 711/100, 154, 165, 170
See application file for complete search history.

(56) References Cited

U.S. PATENT DOCUMENTS

| | | | |
|---|---|---|---|
| 6,473,845 | B1 | 10/2002 | Hornung et al. |
| 6,691,245 | B1 | 2/2004 | DeKoning |
| 6,741,366 | B2 | 5/2004 | Ishikawa et al. |
| 6,901,481 | B2 | 5/2005 | Olson |
| 7,032,228 | B1 | 4/2006 | McGillis et al. |
| 7,222,348 | B1 | 5/2007 | Athreya et al. |
| 7,281,104 | B1 | 10/2007 | Tsypliaev et al. |
| 7,644,239 | B2 | 1/2010 | Ergan et al. |
| 8,174,520 | B2 | 5/2012 | Lin |
| 8,219,758 | B2 | 7/2012 | Wang et al. |
| 8,260,841 | B1 | 9/2012 | Maity |
| 8,266,407 | B2 | 9/2012 | Karamcheti et al. |
| 8,527,693 | B2 | 9/2013 | Flynn et al. |
| 8,898,417 | B1 | 11/2014 | Post et al. |
| 9,223,686 | B1 | 12/2015 | Gupta et al. |
| 9,383,926 | B2 | 7/2016 | Law |
| 9,652,391 | B2 | 5/2017 | Kruckemyer et al. |
| 9,690,716 | B2 | 6/2017 | Li et al. |
| 9,836,232 | B1 | 12/2017 | Vasquez et al. |
| 9,886,210 | B2 | 2/2018 | Frank et al. |
| 9,977,758 | B1 | 5/2018 | Schumacher et al. |
| 10,002,077 | B2 | 6/2018 | Zuckerman et al. |
| 2002/0194558 | A1 | 12/2002 | Wang et al. |
| 2005/0015646 | A1 | 1/2005 | Okada et al. |
| 2005/0125456 | A1 | 6/2005 | Hara et al. |
| 2005/0262306 | A1 | 11/2005 | Nenov et al. |
| 2006/0026339 | A1 | 2/2006 | Rostampour |
| 2007/0220306 | A1 | 9/2007 | Childs et al. |
| 2008/0109629 | A1 | 5/2008 | Karamcheti et al. |
| 2009/0164696 | A1 | 6/2009 | Allen et al. |
| 2009/0198873 | A1 | 8/2009 | Tzeng |
| 2011/0153908 | A1 | 6/2011 | Schaefer et al. |
| 2012/0054746 | A1 | 3/2012 | Vaghani et al. |
| 2012/0079170 | A1 | 3/2012 | Cheng et al. |
| 2012/0290785 | A1 | 11/2012 | Ergan et al. |
| 2012/0297147 | A1 | 11/2012 | Mylly et al. |
| 2012/0303686 | A1 | 11/2012 | Ananthanarayanan et al. |
| 2012/0317348 | A1 | 12/2012 | Tzeng |
| 2012/0317385 | A1 | 12/2012 | Driever et al. |
| 2013/0036128 | A1 | 2/2013 | Ben-tsion et al. |
| 2013/0111103 | A1 | 5/2013 | Dodson et al. |
| 2013/0185503 | A1 | 7/2013 | Bhatta |
| 2013/0275661 | A1 | 10/2013 | Zimmer et al. |
| 2014/0297935 | A1 | 10/2014 | Post et al. |
| 2014/0297938 | A1 | 10/2014 | Puthiyedath et al. |
| 2015/0012690 | A1 | 1/2015 | Bruce et al. |
| 2015/0081644 | A1* | 3/2015 | Pitts .................... G06F 11/1458 707/676 |
| 2015/0081998 | A1 | 3/2015 | Post et al. |
| 2015/0253994 | A1* | 9/2015 | Takada .................... G06F 12/08 711/118 |
| 2015/0331677 | A1* | 11/2015 | Kimura ............... G06F 12/0862 717/148 |
| 2016/0342341 | A1 | 11/2016 | Voigt et al. |
| 2017/0308479 | A1 | 10/2017 | Voigt et al. |
| 2018/0074715 | A1* | 3/2018 | Farmahini-Farahani .................... G06F 12/1009 |

FOREIGN PATENT DOCUMENTS

| | | |
|---|---|---|
| CN | 102804152 A | 11/2012 |
| EP | 2246786 A1 | 11/2010 |
| WO | WO-2013048451 A1 | 4/2013 |
| WO | WO-2013048490 A1 | 4/2013 |
| WO | WO-2013055312 A1 | 4/2013 |
| WO | 2014/100546 A1 | 6/2014 |

OTHER PUBLICATIONS elinux.org, "Application Init Optimizations," (Web Page), May 13, 2009, 5 pages, available at http://elinux.org/Application_Init_Optimizations.

fusionio.com, "ioMemory Virtual Storage Layer (VSL)," (Web Page), Mar. 25, 2011, 3 pages, available at http://www.fusionio.com/overviews/vsl-technical-overview/.

International Search Report & Written Opinion received in PCT Application No. PCT/US2014/019586, dated Oct. 30, 2014, 9 pages.

International Search Report & Written Opinion received in PCT Application No. PCT/US2015/022946, dated Feb. 23, 2016, 12 pages.

International Search Report & Written Opinion received in PCT Application No. PCT/US2015/024159, dated Feb. 23, 2016, 10 pages.

Rudoff, A., "Programming Models for Emerging Non-volatile Memory (NVM) Technologies," (Research Paper), Usenix.org, vol. 38, No. 3, Jun. 2013, 6 pages, available at https://www.usenix.org/system/files/login/articles/08_rudoff_040-045_final.pdf.

VMware, Inc., "Understanding Memory Resource Management in VMware® ESX™ Server," (Research Paper), White Paper, Dec. 15, 2002, 20 pages, available at http://www.vmware.com/files/pdf/perf-vsphere-memory_management.pdf.

International Preliminary Report on Patentability received for PCT Patent Application No. PCT/US2015/024159, dated Oct. 12, 2017, 7 pages.

International Preliminary Report on Patentability received for PCT Patent Application No. PCT/US2015/022946, dated Oct. 12, 2017, 9 pages.

"Filesystem in Userspace," Dec. 28, 2013, <https://web.archive.org/web/20131228094545/http://fuse.sourceforge.net/>, 3 pages.

Brouwer, A., "MMAP(2)," Dec. 31, 2013, Linux Programmer's Manual, <https://web.archive.org/web/20131231045436/http://man7.org/linux/man-pages/man2/mmap.2.html>.

die.net, "mmap(2)—Linux man page," Dec. 4, 2013, https://web.archive.org/web/20131204082903/https://linux.die.net/man/2/mmap.

International Preliminary Report on Patentability received in PCT Application No. PCT/US2014/019586, dated Sep. 15, 2016, 6 pages.

Schoeb, L., "Why is persistent cache important?" Jul. 10, 2013, SearchStorage.com, https://searchstorage.techtarget.com/answer/Why-is-persistent-cache-important?vgnextfmt=print.

Mark Nielsen, "How to use a Ramdisk for Linux," Nov. 1, 1999, <http://www.linuxfocus.org/English/November1999/article124.html>.

SNIA, "NVM Programming Model (NPM)," Dec. 21, 2013, Version 1, <https://www.snia.org/sites/default/files/NVMProgrammingModel_v1.pdf>.

Wikipedia, "mmap," Dec. 16, 2013, <https://en.wikipedia.org/w/index.php?title=Mmap&oldid=586402456>.

Zbr, "Pure in-memory cache VS persistent cache?," Feb. 13, 2013, ioremap.net, <http://www.ioremap.net/2013/02/13/pure-in-memory-cache-vs-persistent-cache/>.

Bach, "How it Works: Intel SSD Caching", available online at <https://www.pugetsystems.com/labs/articles/How-it-Works-Intel-SSD-Caching-148/>, Puget Systems, Jun. 29, 2012, 8 pages.

Appuswamy et al., "Cache, Cache Everywhere, Flushing All Hits Down the Sink: On Exclusivity in Multilevel, Hybrid Caches", IEEE, 2013, 14 pages.

(56) References Cited

OTHER PUBLICATIONS

Lee et al., "Eliminating Periodic Flush Overhead of File I/O with Non-Volatile Buffer Cache", IEEE Transactions on Computers, vol. 65, No. 4, Aug. 18, 2014, pp. 1145-1157.
Libfuse, "Warning: Unresolved Security Issue", available online at <https://web.archive.org/web/20170104054750/https://github.com/libfuse/libfuse>, Jan. 4, 2017, 3 pages.
Liu et al., "RAF: A Random Access First Cache Management to Improve Ssd-Based Disk Cache", Fifth International Conference on Networking, Architecture, and Storage, 2010, pp. 492-500.

* cited by examiner

FILE MIGRATION TO PERSISTENT MEMORY

BACKGROUND

Various memory-based technologies are utilized to improve the speed at which files can be accessed from a file system. For instance, using memory mapping to provide access to a file permits an application to access the mapped portions of the file as if they are in primary memory, which can improve input/output (I/O) performance when accessing the file, especially when the file is large in size.

BRIEF DESCRIPTION OF THE DRAWINGS

Certain examples are described in the following detailed description in reference to the following drawings.

DETAILED DESCRIPTION

Though traditional uses of memory-based technologies can improve access to files on file systems, they also have their drawbacks. For example, using non-volatile memory (NVM) to improve memory-mapped access of file generally requires an application be modified to synchronize or flush writes to NVM, or requires the application use libraries to do so. With respect to using memory mapping to access files, though some data storage devices permit direct memory mapping, others need to be presented as block devices that need to be memory-mapped by allocating volatile memory and synchronizing data to disk.

Various examples described herein provide migration of a file between a non-persistent memory file system and a persistent memory file system. By migrating files to a persistent memory file system, various examples permit a file to be accessed through direct memory mapping (to a persistent memory device associated with the persistent memory file system) without involvement of a page cache (e.g., dynamic random access memory [DRAM]-based page cache), which is a distinct advantage over traditional memory mapping, even with use of non-volatile memory (NVM).

According to some examples, a file is migrated from (storage on) a non-persistent memory file system to (storage on) a persistent memory file system based, at least in part, on a condition relating to memory mapping of the file. For instance, a computer system may migrate a file from a non-persistent memory file system to a persistent memory file system when the computer system determines that the file has been memory-mapped as part of the file being accessed from the non-persistent memory file system (e.g., access by the computer system). For purposes of examples described herein, a file may be considered memory-mapped after a memory mapping occurrence and the file has been closed, or may be considered memory-mapped after the memory-mapping occurrence regardless of whether the file has been closed after the memory-mapping occurrence.

A computer system may migrate a file from a non-persistent memory file system to a persistent memory file system when the computer system determines that the file has been memory-mapped and page cached as a result of the file being accessed from the non-persistent memory file system (e.g., access by the computer system or another computer system). Depending on the example, an indication of whether a file has been memory-mapped may be stored on the non-persistent memory file system, and an indication of whether a file has been page-cached during memory-mapped access may be stored on the non-persistent memory file system. Depending on the example, retention (e.g., storage) of an indication of whether a file has been memory-mapped, or has been page-cached during memory-mapped access, may be caused by a component that facilitates memory mapping on the computer system (e.g., virtual memory component of an operating system), or by a separate component that monitors for memory-mapped access of files by the computer system. After a file has been migrated from a non-persistent memory file system to a persistent memory file system, the computer system may re-migrate the file from the persistent memory file system back to the non-persistent memory file system, and may do so under a particular set of conditions.

Various examples may utilize a file migration policy including a set of criteria that determines whether a file is migrated from a non-persistent memory file system to a persistent memory file system, whether a file re-migrated from the persistent memory file system back to the non-persistent memory file system, or both. In some examples, the file migration policy includes a criterion that the file has an indication of having been memory-mapped during its access from the non-persistent memory file system. Another criterion of the file migration policy may include, without limitation, a history of file access associated with the file, such as historical information regarding frequency of access of the file (e.g., read or write access), write access density (e.g., writes/capacity), frequency of "store" instructions while a file is open, frequency of memory mapping of the file, or how recently the file was memory-mapped. Another criterion of the file migration policy may include, without limitation, the size of the file or the type of file. Yet another criterion of the file migration policy may include, without limitation, a criterion relating to a persistent memory device associated with the persistent memory file system, such as a criterion relating to whether persistent memory device has available data storage space for the persistent memory file system to receive the file from the non-persistent memory file system.

Depending on the example, a file may be migrated from a non-persistent memory file system to a persistent memory file system while the file is closed on the non-persistent memory file system. Accordingly, where a computer system is accessing the file from the non-persistent memory file system, the computer system may migrate the file from the non-persistent memory file system to the persistent memory file system after the file is closed on the non-persistent memory file system. Likewise, a file may be re-migrated from the persistent memory file system back to the non-persistent memory file system while the file is closed on the persistent memory file system. Accordingly, where a computer system is accessing the file from the persistent memory file system, the computer system may migrate the file from the persistent memory file system to the non-persistent memory file system after the file is closed on the persistent memory file system.

As used herein, a persistent memory file system can include a file system implemented using a persistent memory device, such as a phase change memory (PCM) device. As used herein, a non-persistent memory file system can include a file system implemented using a non-persistent memory device, such as a hard disk drive (HDD), a solid-state drive (SSD), or some other non-volatile memory device, and capable of memory-mapped access to a file using a page cache. As used herein, access of a file can include reading data from or writing data to a portion of the file. Additionally, as used herein, migrating a file from a first file system to a second file system may involve moving the file from the first file system to the second file system (e.g., copying the file to the second file system and removing the file from the first file system), or may involve copying the file to the second file system while retaining the file on the first file system as-is (thereafter using the copy of the file on the second file system as the active copy for subsequent file access purposes).

According to some examples, a migration policy engine decides for a closed file (e.g., a file closed after being open) whether the file should be migrated from a non-persistent memory file system (associated with a non-persistent memory device) to a persistent memory file system (associated with a persistent memory device) and uses an indication that the file has been memory-mapped as part of the criteria for the migration. After the file has been migrated to the persistent memory file system, the next time the file is opened from the persistent memory file system, one or more portions of the file can be memory-mapped directly to the persistent memory device through the persistent memory file system. When a portion of a file is directly memory-mapped to the persistent memory device through the persistent memory file system, a memory address can be directly mapped to the permanent location on the persistent memory device where the portion of the file is stored. Such a direct mapping can permit (e.g., an application to) access to the file using load (e.g., ld) and store (e.g., st) machine code instructions of a processor (e.g., central processing unit [CPU]), and can permit such access with no need for page caching, data copying, or input/output by the persistent memory file system. Additionally, since the file is no longer being accessed from the non-persistent memory file system, some examples can avoid any page caching that may be associated with memory-mapped access from the non-persistent memory file system.

Various examples utilize a virtual file system module to provide a single file namespace implemented by a plurality of different file systems, which includes a non-persistent memory file system and a persistent memory file system. In this way, such examples can provide a single memory-mapped file namespace to access a given file regardless of which file system the given file is stored upon. As a consequence, such examples permit the given file to migrate between the non-persistent memory file system and the persistent memory file system without an impact to the file namespace. This can permit migration of the given file between the non-persistent memory file system (e.g., disk-based file system) and the persistent memory file system (e.g., phase change memory-based file system) to be transparent to an application, thereby permitting the application to access the given file without disruption.

The following describes an example file migration system in the context of an example life cycle of a particular file. The example life cycle may begin with the particular file being stored on a non-persistent memory file system (e.g., based on a hard-disk drive or a solid-state drive) and the particular file being accessed (e.g., opened) from the non-persistent memory file system (e.g., by an application). As described herein, the non-persistent memory file system may include a file system capable of providing memory-mapped access to a file using a page cache. For the example file migration system, after the particular file is memory mapped (e.g., using a mmap system call), an indication of this memory-mapping occurrence is retained (e.g., stored) in association with the particular file. The indication of the memory-mapping occurrence may be retained on the non-persistent memory file system and may be retained after access to the particular from the non-persistent memory file system is closed (e.g., the particular file is closed on the non-persistent memory file system). The indication of the memory-mapping occurrence declares that the particular file has been memory-mapped in the past and, as such, may be memory-mapped again. Accordingly, for files closed and currently stored on the non-persistent memory file system, the example file migration system can detect (e.g., as a continuous background process) whether the files have been memory-mapped by checking whether each of those files has an indication of a memory-mapping occurrence.

Continuing with the example life cycle, after the particular file being accessed from the non-persistent memory file system is closed, the example file migration will detect that the particular file has been memory-mapped, and will detect this based on the presence of an associated indication of a memory-mapping occurrence. Upon this detection, the example file migration may migrate the particular file from the non-persistent memory file system to the persistent memory file system. As described herein, the migration may be facilitated within a virtual file system module as to maintain a single file namespace and to avoid or at least minimize disruption of an application's access to the particular file. As also described herein, migrating the particular file from the non-persistent memory file system to the persistent memory file system may involve moving the file from the non-persistent memory file system to the persistent memory file system, or may involve copying the particular file to the persistent memory file system and retaining a copy of the particular file on the non-persistent memory file system. In addition to detecting whether the particular file has been memory-mapped, the example file migration system may decide to migrate the particular file from the non-persistent memory file system to the persistent memory file system based on a migration policy including a set of criteria for migrating files. An example criterion can include frequency of access of the particular file (e.g., frequency of reads or writes while the file was stored on the non-persistent memory file system), time of access of the particular file (e.g., file access was recent), a criterion relating to the memory-mapping history associated with the particular file (e.g., memory-mapped over a threshold number of times or within a threshold time), a criterion relating to the file (e.g., size or type of file), or a criterion relating to the status or condition of the persistent memory file system (e.g., memory pressure of the persistent memory device associated with the persistent memory file system).

After the particular file has been migrated from the non-persistent memory file system to the persistent memory file system, when the file is opened (e.g., by an application), the particular file will be accessed from the persistent memory file system without involvement of the non-persistent memory file system and its associated page cache. As described herein, once on the persistent memory file system, one or more portions of the particular file on the persistent memory file system can be directly memory mapped without need of a page cache.

Continuing with the example life cycle, the example file migration system may re-migrate the particular file system from the persistent memory file system back to the non-persistent memory file system. The example file migration system may decide to re-migrate the particular file back to the non-persistent memory file system based on a migration policy including a set of criteria for re-migrating files. An example criterion can include frequency of access of the particular file (e.g., file is no longer frequently accessed from the persistent memory file system), file size, file type, memory-mapping frequency, and the like. The re-migration of the particular file to the non-persistent memory file system would represent the end of the example life cycle.

The following provides a detailed description of the examples illustrated by FIGS. 1-8.

Figure 1:
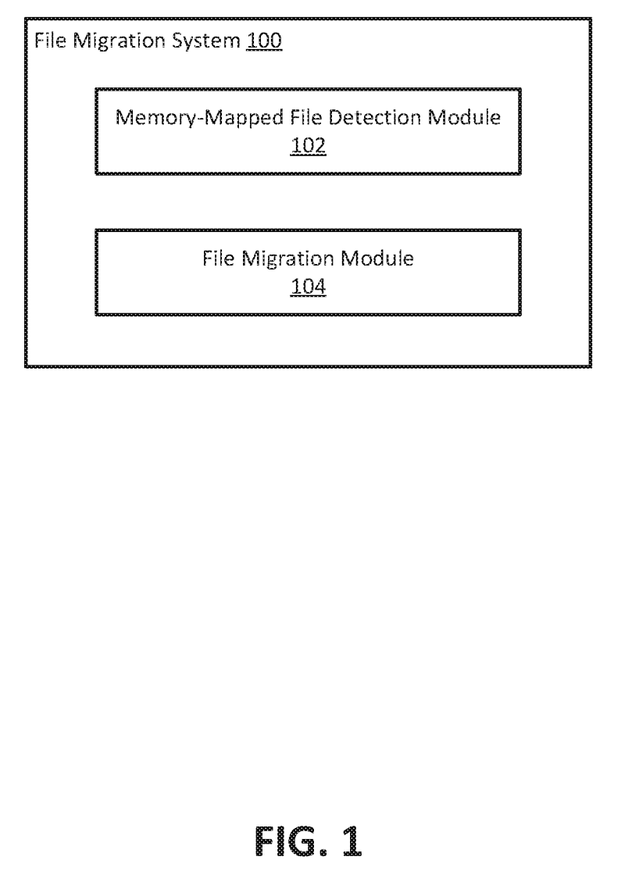
FIGS. 1 and 2 illustrate example file migration systems for migrating a file from a non-persistent memory file system to a persistent memory file system.

FIG. 1 illustrates an example file migration system 100 for migrating a file from a non-persistent memory file system to a persistent memory file system. As shown, the file migration system 100 includes a memory-mapped file detection module 102 and a file migration module 104. Depending on the example, the file migration system 100 may be part of a computer system, such as a desktop, laptop, hand-held computing device (e.g., personal digital assistants, smartphones, tablets, etc.), workstation, server or other device that includes a processor. In various examples, the components or the arrangement of components in the file migration system 100 may differ from what is depicted in FIG. 1.

As used herein, modules and other components of various examples may comprise, in whole or in part, machine-readable instructions or electronic circuitry. For instance, a module may comprise computer-readable instructions executable by a processor to perform one or more functions in accordance with various examples described herein. Likewise, in another instance, a module may comprise electronic circuitry to perform one or more functions in accordance with various examples described herein. The elements of a module may be combined in a single package, maintained in several packages, or maintained separately.

The memory-mapped file detection module 102 may facilitate detecting, on a non-persistent memory file system, a file that has been memory-mapped while being accessed from the non-persistent memory file system by a computer system. The non-persistent memory file system may be local to the computer system and associated with a local non-persistent memory device, or may be remote to the computer system (e.g., maintained on another computer system), associated with a remote non-persistent memory device (e.g., one on the other computer system), and accessible by the computer system over a communication medium (e.g., over a communications network, such as the Internet or a local area network).

As described herein, the file may be one that is currently closed on the non-persistent memory file system and that had at least a portion itself memory-mapped during its access (e.g., by the computer system or, possibly, another computer system). The previous access to which the memory mapping is associated may have occurred recent to the detection of the file by the memory-mapped file detection module 102.

For some examples, the memory-mapped file detection module 102 detects that a file has been memory-mapped based on an indicator stored or retained on the non-persistent memory file system in association with the file. The indicator may be stored or retained in association with the file upon a memory-mapping of the file or after a memory-mapping of the file and upon closing of the file. Depending on the example, the memory-mapped file detection module 102 may facilitate monitoring for memory-mapped access of files stored on the non-persistent memory file system and cause the storage/retention of the memory-mapped indicator in association with the files.

The file migration module 104 may facilitate migrating the file, detected by the memory-mapped file detection module 102, from the non-persistent memory file system to a persistent memory file system. For some examples, the file migration module 104 migrates the file from the non-persistent memory file system to the persistent memory file system by moving the file from the non-persistent memory file system to the persistent memory file system (e.g., copying the file to the persistent memory file system and removing the file the non-persistent memory file system). In other examples, the file migration module 104 migrates the file from the non-persistent memory file system to the persistent memory file system by copying the file to the persistent memory file system while retaining the file on the non-persistent memory file system as-is and using the copy of the file on the persistent memory file system as the active copy for subsequent file access purposes.

According to some examples, the file migration module 104 migrates the file from the non-persistent memory file system to the persistent memory file system based on a set of criteria that assists the file migration module 104 in determining whether the file should be migrated from the non-persistent memory file system to the persistent memory file system. One or more criteria in the set of criteria may function as a trigger for the file migration module 104 migrating the file from the non-persistent memory file system to the persistent memory file system.

As described herein, the set of criteria may be part of a migration policy that determines operation of the file migration module 104. The set of criteria may include, without limitation, a criterion that the file have an indication of having been memory-mapped during its access from the non-persistent memory file system. The set of criteria may include, without limitation, a criterion relating to a history of file access associated with the file, such as historical information regarding frequency of access of the file or frequency of memory mapping of the file. The set of criteria may include, without limitation, a criterion relating to a persistent memory device associated with the persistent memory file system, such as whether persistent memory device has available data storage space for the persistent memory file system to receive the file from the non-persistent memory file system.

Figure 2:
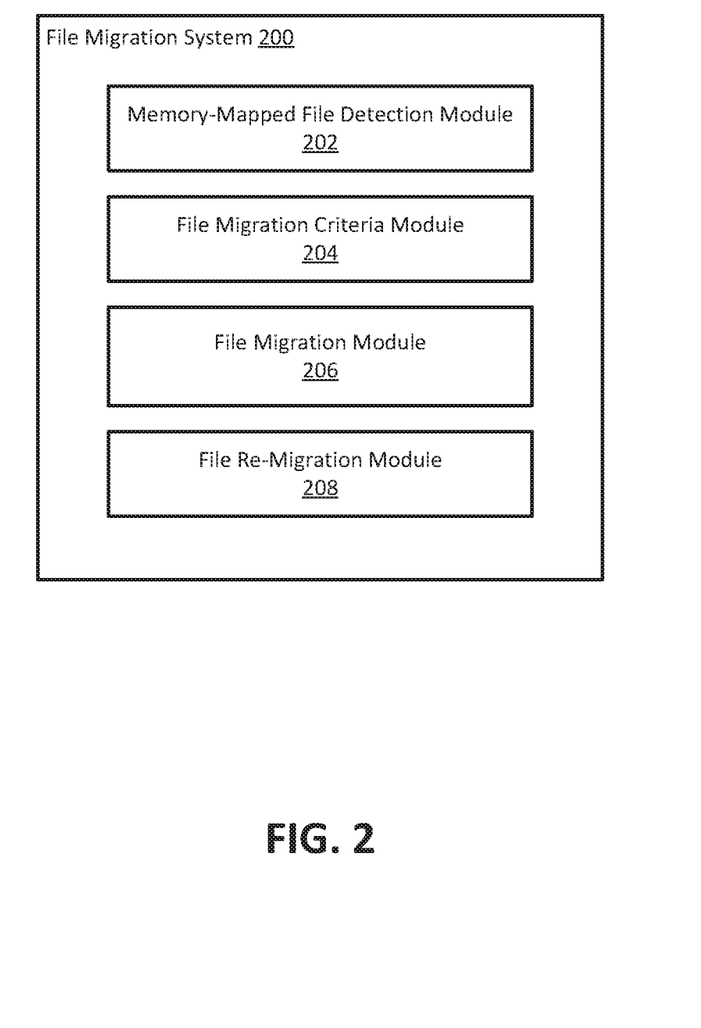

FIG. 2 illustrates an example file migration system 200 for migrating a file from a non-persistent memory file system to a persistent memory file system. As shown, the file migration system 200 includes a memory-mapped file detection module 202, a file migration criteria module 204, a file migration module 206, and a file re-migration module 208. Depending on the example, the file migration system 200 may be part of a computer system, such as a desktop, laptop, hand-held computing device (e.g., personal digital assistants, smartphones, tablets, etc.), workstation, server, or other device that includes a processor. In various examples, the components or the arrangement of components in the file migration system 200 may differ from what is depicted in FIG. 2.

The memory-mapped file detection module 202 may be similar to the memory-mapped file detection module 102 described above with respect to the file migration system 100 of FIG. 1. The file migration criteria module 204 may facilitate determining, based on a set of criteria, whether a file should be migrated from a non-persistent memory file system to a persistent memory file system. The file migration module 206 may be similar to the file migration module 104 described above with respect to the file migration system 100 of FIG. 1. The file migration module 206 may migrate the file from the non-persistent memory file system to the persistent memory file system in response to a determination by the file migration criteria module 204.

After the file migration module 206 migrates the file from the non-persistent memory file system to the persistent memory file system, the file re-migration module 208 may facilitate migrating the file from the persistent memory file system to the non-persistent memory file system. According to some examples, the file re-migration module 208 migrates the file from the persistent memory file system to the non-persistent memory file system based on a set of criteria that determines whether (e.g., when) the file should be re-migrated from the persistent memory file system to the non-persistent memory file system. In some examples, file migration criteria module 204 may facilitate determining, based on the set of criteria, whether (e.g., when) the file should be migrated from the persistent memory file system back to the non-persistent memory file system. As described herein, the set of criteria may be part of a migration policy that determines operation of the file re-migration module 208.

Figure 3:
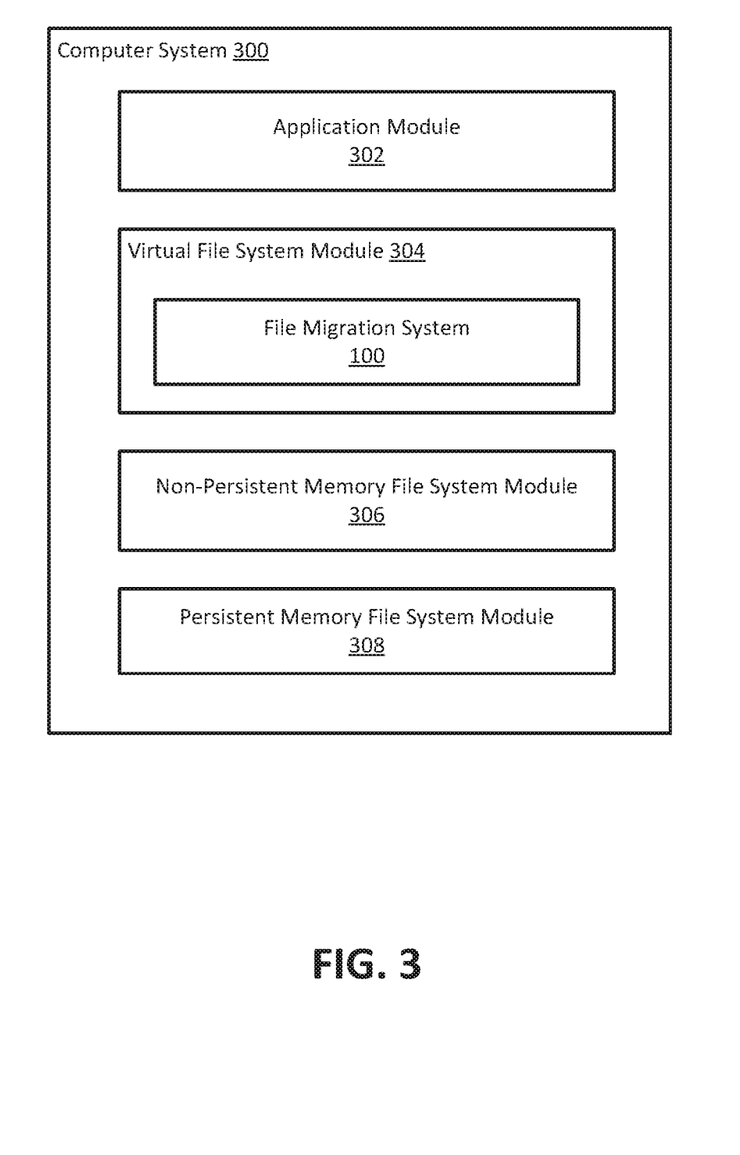
FIGS. 3 and 4 illustrate example computer systems each including an example file migration system.

FIG. 3 illustrates an example computer system 300 including the file migration system 100. The computer system 300 may be any computing device having a processor and memory, such as a desktop, laptop, hand-held computing device (e.g., personal digital assistants, smartphones, tablets, etc.), workstation, server, or other device that includes a processor. As shown, the computer system 300 includes an application module 302, a virtual file system module 304, a non-persistent memory file system module 306, and a persistent memory file system module 308. As also shown, the virtual file system module 304 includes the file migration system 100. In various examples, the components or the arrangement of components in the computer system 300 may differ from what is depicted in FIG. 3.

The application module 302 represents any firmware or software (e.g., software application or operating system) operable on the computer system 300 and that capable of accessing (e.g., read from, write to, or modify) a file stored on a file system. For some examples, when the application module 302 opens a file from a file system to access the file and, eventually, may close the file when it has completed its access of the file. When the application module 302 accesses a file from a non-persistent memory file system, it may be memory-mapped using a volatile memory device, included by the computer system 300 (not shown), as a page cache.

The virtual file system module 304 may be one that provides the application module 302 with a virtual file system having a single file namespace but being associated with (e.g., based on) a plurality of separate file systems of similar (e.g., two or more non-persistent memory file systems) or different types (e.g., a non-persistent memory file system and a persistent memory file system). The virtual file system module 304 may use FUSE, a stackable file system, or the like, to interpose a virtual file system layer between the application module 302 and plurality of file systems. In this way, the virtual file system module 304, can provide (e.g., present for access) the plurality of file systems to the application module 302 as a single (virtual) file system having a single file namespace. Accordingly, for some examples, when a file is migrated between two different file systems underlying the single virtual file system (e.g., a file is migrated between a non-persistent memory file system and a persistent memory file system), the single file namespace provided by the virtual file system is maintained and the application module 302 does not perceive a change to the single file namespace provided by the virtual file system.

For various examples, the plurality of file systems includes a non-persistent memory file system, associated with a non-persistent memory device (e.g., hard-disk drive or solid-state drive), and a persistent memory file system, associated with a persistent memory device, such as a phase-change memory (PCM) device. Accordingly, for some examples, the virtual file system module 304 provides a single virtual file system comprising a non-persistent memory file system accessible by the computer system 300 and a persistent memory file system accessible by the computer system 300.

As part of the virtual file system module 304, the file migration system 100 can detect, on a non-persistent memory file system presented through the virtual file system module 304, a file that has been memory-mapped while being accessed from the non-persistent memory file system by the computer system 300. As described herein, based on a set of criteria (e.g., migration policy), the file migration system 100 may decide whether the detected file should be migrated from the non-persistent memory file system to a persistent memory file system presented by the virtual file system module 304, and execute operations accordingly. As also described herein, after a particular file is migrated, the file migration system 100 may decide, based on a set of criteria (e.g., migration policy), whether (e.g., when) the particular file should be migrated from the persistent memory file system to the non-persistent memory file system (e.g., re-migrated back), and execute operations accordingly.

The non-persistent memory file system module 306 may facilitate access of a non-persistent memory file system by the computer system 300. For example, the non-persistent memory file system module 306 may implement the non-persistent memory file system at the computer system 300 and may include the non-persistent memory device upon which the non-persistent memory file system is based. Depending on the example, the non-persistent memory file system may be one local to the computer system 300 and associated with a non-persistent memory device included by the computer system 300, or may be one remote to the computer system 300, associated with a non-persistent memory device included by another computer system, and accessible by the computer system 300 through a communications interface (e.g., over a communications network).

The persistent memory file system module 308 may facilitate access of a persistent memory file system by the computer system 300. For instance, the non-persistent memory file system module 306 may implement the persistent memory file system at the computer system 300 and may include the persistent memory device upon which the persistent memory file system is based. For various examples, the persistent memory file system is maintained locally by the computer system 300 and associated with a memory device locally included by the computer system 300.

Figure 4:
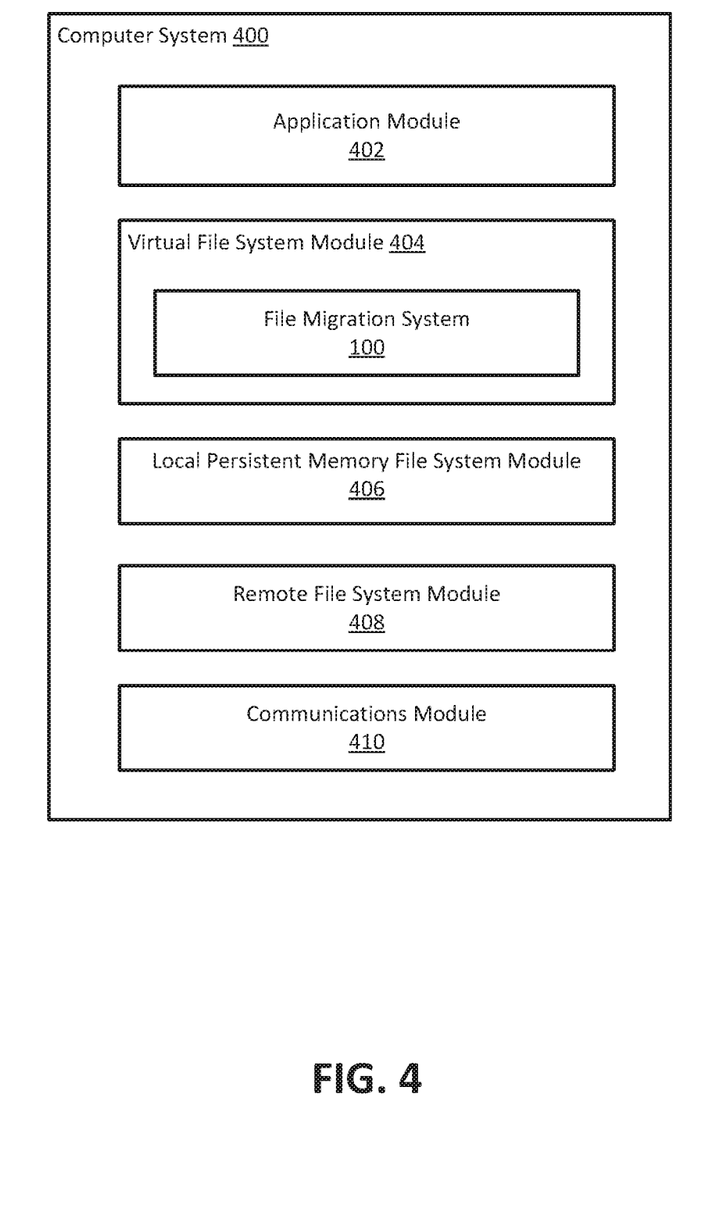

FIG. 4 illustrates an example computer system 400 including the file migration system 100. The computer system 400 may be any computing device having a processor and memory, such as a desktop, laptop, hand-held computing device (e.g., personal digital assistants, smartphones, tablets, etc.), workstation, or other device that includes a processor. As shown, the computer system 400 includes an application module 402, a virtual file system module 404, a local persistent memory file system module 406, a remote file system module 408, and a communications module 410. As also shown, the virtual file system module 404 includes the file migration system 100. In various examples, the components or the arrangement of components in the computer system 400 may differ from what is depicted in FIG. 4.

The application module 402 may be similar to the application module 302 described above with respect to the computer system 300 of FIG. 3, and the virtual file system module 404 may be similar to the application module 302 described above with respect to the computer system 300 of FIG. 3. For some examples, the virtual file system module 404 provides (e.g., presents) the application module 302 with a single virtual file system that has a single file namespace and that is based on a plurality of separate file systems including a remote file system and a local persistent memory file system. The remote file system may be a file system remote to the computer system 400, maintained by another computer system with which the computer system 400 can communicate, and associated with a persistent memory device or a non-persistent memory device included by the other computer system. For some examples, the application module 402 accesses files on the remote file system through the virtual file system module 404, and the virtual file system module 404 accesses the remote file system over a communications network through a network connection with the other computer system.

The local persistent memory file system module 406 may facilitate access to a persistent memory file system maintained locally by the computer system 400. For instance, the local persistent memory file system module 406 may implement the persistent memory file system at the computer system 400 and may include the local persistent memory device upon which the non-persistent memory file system is based.

The remote file system module 408 may facilitate access to a file system remote to the computer system 400. As described herein, the remote file system may be maintained by another computer system with which the computer system 400 can communicate, and may be associated with a persistent memory device or a non-persistent memory device included by the other computer system.

The communications module 410 may facilitate communication of the computer system 400 with another computer system over a communications network that that permits data communication. The communications network may comprise one or more local or wide-area communications networks, such as the Internet, WiFi networks, cellular networks, private networks, public networks, and the like. As described herein, the computer system 400 may access a remote file system that is maintained by another computer system. As the computer system 400 accesses a remote file system, the communications module 410 may facilitate the exchange of network data packets between the computer system 400 and the computer system maintaining the remote file system.

Figure 5:
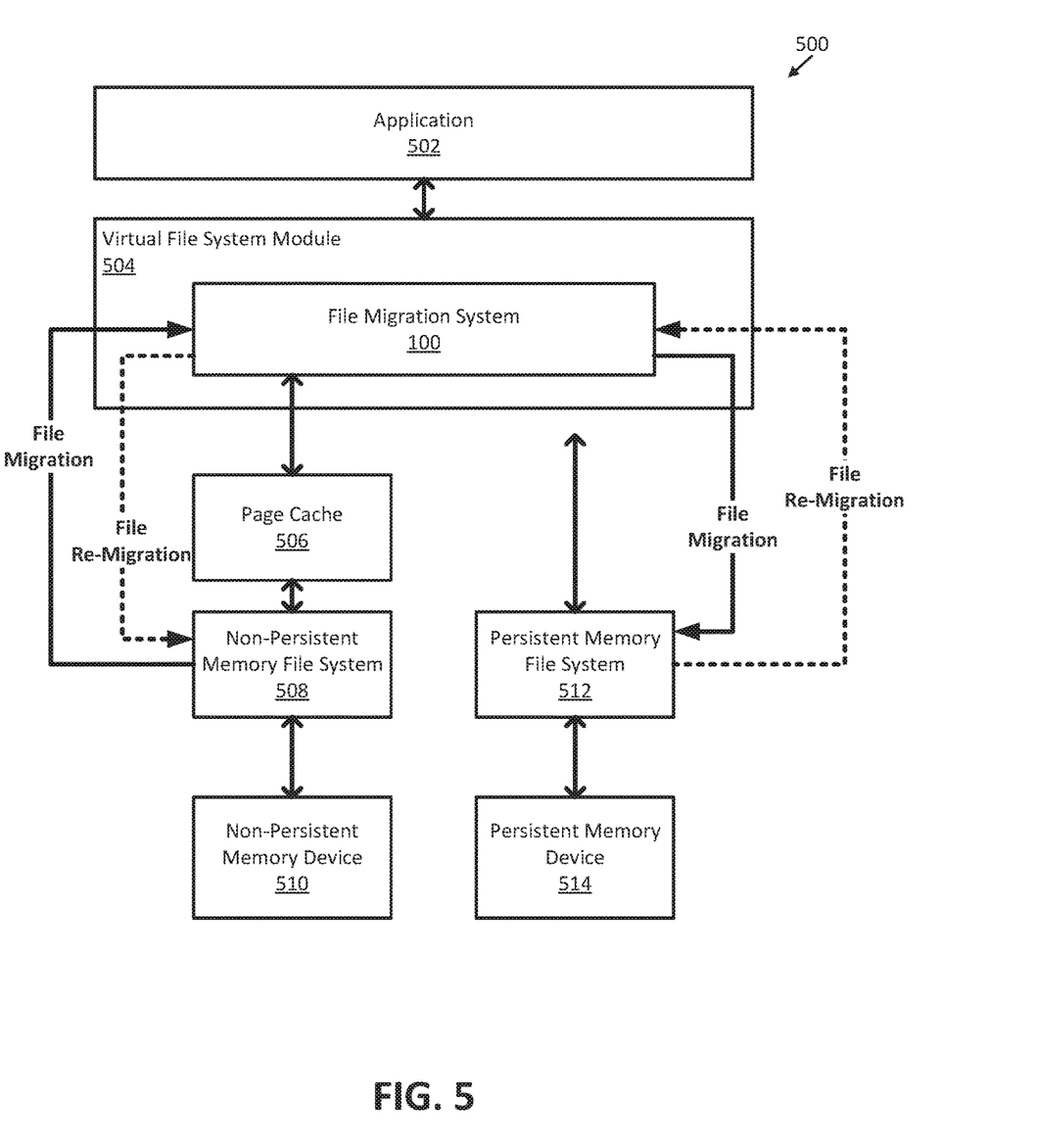
FIG. 5 illustrates example data flow in an example computing environment that includes an example file migration system.

FIG. 5 illustrates example data flow in an example computing environment 500 that includes the file migration system 100. As shown, the computing environment 500 includes an application 502, a virtual file system module 504 that includes the file migration system 100, a page cache 506, a non-persistent memory file system 508, a non-persistent memory device 510, a persistent memory file system 512, and a persistent memory device 514. According to some examples, the virtual file system module 504 provides the application 502 with a virtual file system having a single file namespace but being based on the non-persistent memory file system 508, associated with the non-persistent memory device 510, and the persistent memory file system 512, associated with the persistent memory device 514. The page cache 506 may support memory mapping of files stored on the non-persistent memory file system 508.

During an operation in the computing environment 500, the application 502 may open and access a given file stored on the non-persistent memory file system 508 but provided by the virtual file system module 504 as part of a single name space. When the given file is accessed by the application 502 through the virtual file system module 504, the given file may be memory-mapped using the page cache 506. When the given file is memory-mapped, the file may be marked as so by an indicator stored on the non-persistent memory file system 508 in association with the file. The storage of this indicator may be caused by the file migration system 100. Additionally, the storage of the indicator may occur when the file is closed by the application 502 or sometime after.

After the given file has been closed on the non-persistent memory file system 508, via its associated indicator, the file migration system 100 may detect that the given file has been memory-mapped and may decide, based on a set of criteria (e.g., migration policy), whether the file should be migrated from the non-persistent memory file system 508 to the persistent memory file system 512. When the file migration system 100 determines that the file should be migrated based on the set of criteria, the file migration system 100 may migrate (e.g., copy or move) the given file from the non-persistent memory file system 508 to the persistent memory file system 512 while maintaining the single file namespace being provided to the application 502 by the virtual file system module 504, thereby avoiding disruption of access to the given file by the application 502 between access sessions. Eventually, based on a set of criteria (e.g., a different set included in the migration policy), the file migration system 100 may decide whether (e.g., when) the given file should be re-migrated (e.g., copied or moved) from the persistent memory file system 512 back to the non-persistent memory file system 508.

Figure 6:
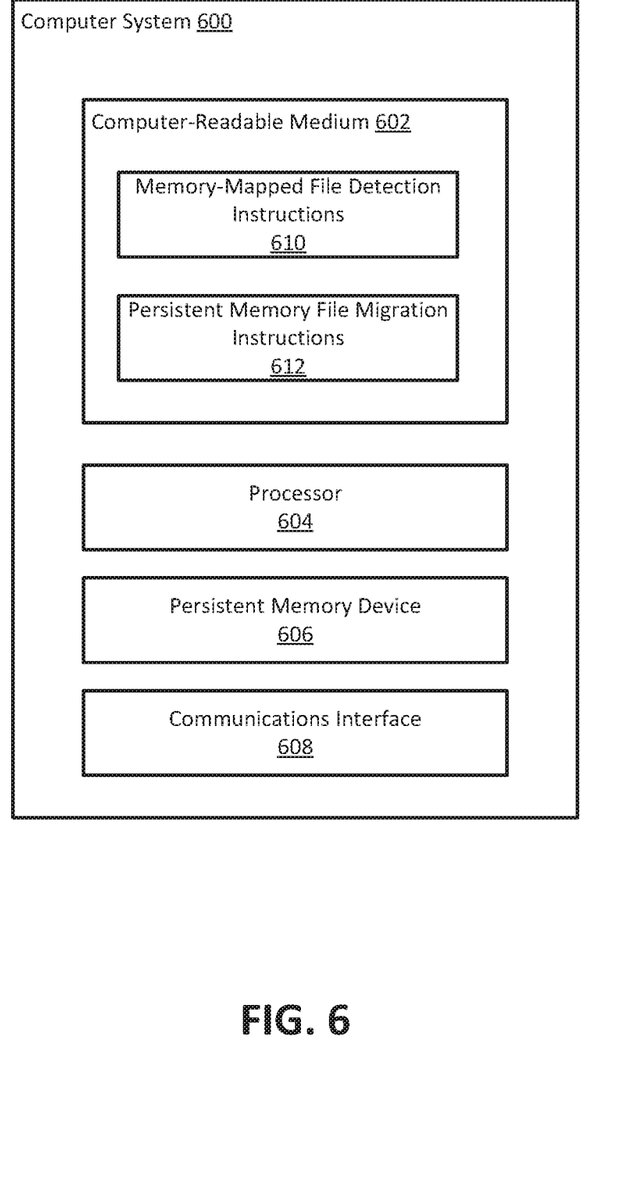
FIG. 6 illustrates an example computer system for migrating a file from a non-persistent memory file system to persistent memory.

FIG. 6 illustrates an example computer system 600 for migrating a file from a non-persistent memory file system to persistent memory. As shown, the computer system 600 includes a computer-readable medium 602, a processor 604, a persistent memory device 606, and a communications interface 608. In various examples, the components or the arrangement of components of the computer system 600 may differ from what is depicted in FIG. 6. For instance, the computer system 600 can include more or less components than those depicted in FIG. 6.

The computer-readable medium 602 may be any electronic, magnetic, optical, or other physical storage device that stores executable instructions. For example, the computer-readable medium 602 may be a Random Access Memory (RAM), an Electrically-Erasable Programmable Read-Only Memory (EEPROM), a storage drive, an optical disc, or the like. The computer-readable medium 602 can be encoded to store executable instructions that cause the processor 604 to perform operations in accordance with various examples described herein. In various examples, the computer-readable medium 602 is non-transitory. As shown in FIG. 6, the computer-readable medium 602 includes memory-mapped file detection instructions 610 and persistent memory file migration instructions 612.

The processor 604 may be one or more central processing units (CPUs), microprocessors, or other hardware devices suitable for retrieval and execution of one or more instructions stored in the computer-readable medium 602. The processor 604 may fetch, decode, and execute the instructions 610 and 612 to enable the computer system 600 to perform operations in accordance with various examples described herein. For some examples, the processor 604 includes one or more electronic circuits comprising a number of electronic components for performing the functionality of one or more of the instructions 610 and 612.

The persistent memory device 606 may include a phase-change memory device or the like. Based on the persistent memory device 606, the computer system 600 may support a local persistent memory file system at the computer system 600, which may be provided to an application on the computer system 600 as part of a virtual file system.

The communications interface 608 may facilitate communication between the computer system 600 and a remote network entity, such as another computer system, which may have a remote file system. As described herein, for some examples, a file that is detected as having been memory mapped while being accessed from a remote file system may be migrated from the remote file system to a local persistent memory file system, such as one associated with the persistent memory device 606. Accordingly, instructions 610 and 612 can cause the processor 604 to send or receive network traffic through the communications interface 608 to facilitate migration of a file from the remote file system to the local persistent memory file system, and to facilitate re-migration of the file from the local persistent memory file system to the remote file system.

The memory-mapped file detection instructions 610 may cause the processor 604 to detect, on a remote file system accessible to the computer system 600 through the communications interface 608, a file that has been memory-mapped while being accessed from the remote file system by the computer system 600. The persistent memory file migration instructions 612 may cause the processor 604 to migrate the file detected by the processor 604 from the remote file system to a persistent memory file system based on the persistent memory device 606 of the computer system 600. As described herein, the remote file system may be a persistent memory file system associated with (e.g., based on) a persistent memory device, or a non-persistent memory file system based on a non-persistent memory device remote with respect to the computer system 600.

Figure 7:
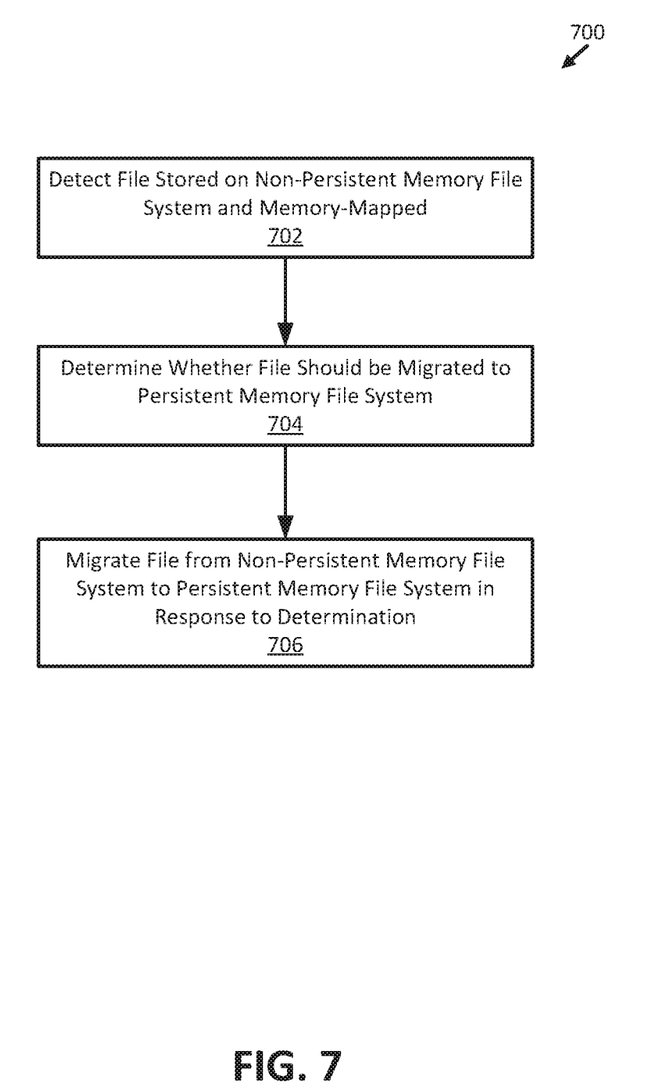
FIGS. 7 and 8 illustrate example methods performed by an example computer system to migrate a file to persistent memory.

FIG. 7 illustrates an example method 700 performed by an example computer system to facilitate migration of a file from a non-persistent memory file system to a persistent memory file system. Although execution of the method 700 is described below with reference to the file migration system 200 of FIG. 2 and a computer system, execution of the method 700 by other suitable systems or devices may be possible. The method 700 may be implemented in the form of executable instructions stored on a computer-readable medium or in the form of electronic circuitry.

In FIG. 7, the method 700 begins at block 702, with the memory-mapped file detection module 202 detecting, on a non-persistent memory file system accessible by a computer system, a file that has been memory-mapped during access by the computer system. At block 704, the method 700 continues with the file migration criteria module 204 determining whether the file detected at block 702 should be migrated from the non-persistent memory file system to a persistent memory file system accessible by the computer system. As described herein, the file migration criteria module 204 performs this determination based on a set of criteria that a trigger for migrating a file from a non-persistent memory file system to a persistent memory file system. At block 706, the method 700 continues with the file migration module 206 migrating the file detected at block 702 from the non-persistent memory file system to the persistent memory file system in response to the determination at block 704.

Figure 8:
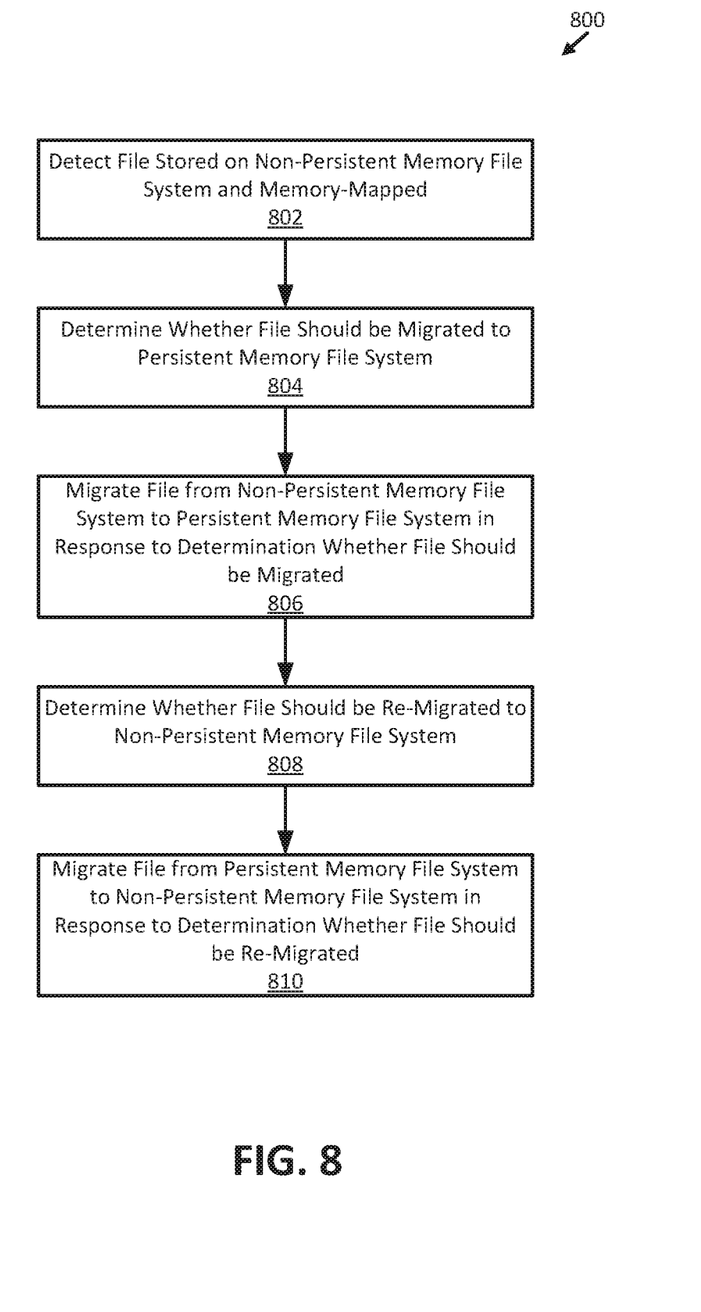

FIG. 8 illustrates an example method 800 performed by an example computer system to facilitate migration of a file from a non-persistent memory file system to a persistent memory file system. Although execution of the method 800 is described below with reference to the file migration system 200 of FIG. 2 and a computer system, execution of the method 800 by other suitable systems or devices may be possible. The method 800 may be implemented in the form of executable instructions stored on a computer-readable medium or in the form of electronic circuitry.

In FIG. 8, the method 800 begins at block 802, which may be similar to block 702 of the method 700 as described above with respect to FIG. 7. Likewise, blocks 804 and 806 may be respectively similar to blocks 704 and 706 of the method 700 as described above with respect to FIG. 7.

At block 808, the method 800 continues with the file migration criteria module 204 determining whether the file, migrated at block 806, should be re-migrated from the persistent memory file system back to the non-persistent memory file system. As described herein, the file migration criteria module 204 performs this determination based on a set of criteria that define a trigger for re-migrating a file from a persistent memory file system to a non-persistent memory file system.

At block 810, the method 800 continues with the file re-migration module 208 re-migrating the file, migrated at block 806, from the persistent memory file system to the non-persistent memory file system in response to the determination at block 808.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A system, comprising:
   a processor; and
   a non-transitory storage medium storing instructions executable on the processor to:
   present, to a program, a non-persistent memory file system and a persistent memory file system as a virtual file system;
   set an indicator stored on the non-persistent memory file system to indicate that a file has been memory-mapped while being accessed from the non-persistent memory file system, in response to a memory mapping of the file and a closing of the file after the memory mapping;
   detect, based on the indicator stored on the non-persistent memory file system, the file as being memory-mapped; and
   migrate the file detected as being memory-mapped from the non-persistent memory file system to the persistent memory file system.

2. The system of claim 1, wherein the instructions are executable on the processor to migrate the file from the non-persistent memory file system to the persistent memory file system based on a set of criteria that determines whether the file should be migrated from the non-persistent memory file system to the persistent memory file system.

3. The system of claim 2, wherein the set of criteria includes a criterion relating to a frequency of access of the file.

4. The system of claim 1, wherein the instructions are executable on the processor to migrate the file from the persistent memory file system to the non-persistent memory file system after the migrating of the file from the non-persistent memory file system to the persistent memory file system.

5. The system of claim 4, wherein the instructions are executable on the processor to migrate the file from the persistent memory file system to the non-persistent memory file system based on a set of criteria that determines whether the file should be re-migrated from the persistent memory file system to the non-persistent memory file system.

6. The system of claim 1, wherein the virtual file system has a unified namespace comprising the non-persistent memory file system and the persistent memory file system.

7. The system of claim 1, wherein the persistent memory file system is local to the system, and the non-persistent memory file system is remote from the system.

8. The system of claim 1,
wherein the memory mapping of the file is in response to a memory map system call during the access of the file from the non-persistent memory file system.

9. The system of claim 8, wherein the instructions are executable on the processor to:
associate the indicator on the non-persistent memory file system with the file.

10. The system of claim 1, wherein the detecting of the file as being memory-mapped based on the indicator is performed after the closing of the file.

11. A non-transitory computer readable medium comprising instructions that upon execution cause a computer system to:
present, to a program, a virtual file system comprising a non-persistent memory file system and a persistent memory file system;
set a memory-mapped indicator to indicate that a file has been memory-mapped while being accessed from the non-persistent memory file system, in response to a memory mapping of the file and a closing of the file after the memory mapping;
detect, based on the memory-based indicator on the non-persistent memory file system, the file that has been as being memory-mapped while being accessed from the non-persistent memory file system by the program;
migrate the file detected as being memory-mapped from the non-persistent memory file system to the persistent memory file system; and
after the migrating of the file from the non-persistent memory file system to the persistent memory file system:
in response to a request to open the file by the program, access the file from the persistent memory file system without involvement of the non-persistent memory file system and a cache associated with the non-persistent memory file system.

12. The non-transitory computer readable medium of claim 11, wherein the instructions upon execution cause the computer system to:
store the memory-mapped indicator in the non-persistent memory file system in association with the file.

13. The non-transitory computer readable medium of claim 12, wherein the detecting that the file has been memory-mapped is based on the memory-mapped indicator stored in the non-persistent memory file system.

14. A method, comprising:
presenting, to a program in a computer system, a non-persistent memory file system and a persistent memory file system as a virtual file system;
setting a memory-mapped indicator to indicate that a file has been memory-mapped while the file is accessed from the non-persistent memory file system, in response to a memory map system call during the access of the file from the non-persistent memory file system and a closing of the file after a memory mapping of the file performed responsive to the memory map system call;
storing the memory-mapped indicator on the non-persistent memory file system in association with the file;
detecting, by the computer system based on the memory-mapped indicator stored on the non-persistent memory file system, the file that is stored on the non-persistent memory file system as being memory-mapped;
determining, by the computer system, whether the file should be migrated from the non-persistent memory file system to the persistent memory file system; and
in response to the determining that the file should be migrated, migrating, by the computer system, the file from the non-persistent memory file system to the persistent memory file system.

15. The method of claim 14, wherein the determining is based on a set of criteria comprising a frequency of access of the file.

16. The method of claim 14, comprising:
determining, by the computer system, whether the file should be re-migrated from the persistent memory file system to the non-persistent memory file system; and
in response to the determining that the file should be re-migrated, migrating, by the computer system, the file from the persistent memory file system to the non-persistent memory file system.

17. The method of claim 14, wherein the detecting of the file as being memory-mapped based on the memory-mapped indicator is performed after the closing of the file.

* * * * *